United States Patent [19]
Lynn et al.

[11] Patent Number: 6,126,714
[45] Date of Patent: Oct. 3, 2000

[54] REVERT MANUFACTURED FROM IRON-BEARING WASTE MATERIAL

[75] Inventors: John D. Lynn, Center Valley, Pa.; Colvin W. Smith, Catonsville, Md.; Glenn C. Keyser, Freemansburg, Pa.

[73] Assignee: Bethlehem Steel Corporation

[21] Appl. No.: 09/330,181

[22] Filed: Jun. 15, 1999

Related U.S. Application Data

[63] Continuation of application No. 09/070,661, Apr. 30, 1998, which is a continuation-in-part of application No. 08/835,168, Apr. 8, 1997, Pat. No. 5,785,737.

[51] Int. Cl.$^7$ ....................................................... C22B 7/04

[52] U.S. Cl. ................................. 75/316; 75/327; 75/961

[58] Field of Search ............................. 75/313, 314, 316, 75/327, 961, 751, 746, 770

[56] References Cited

U.S. PATENT DOCUMENTS

| Re. 30,060 | 7/1979 | Kreiger | 75/770 |
|---|---|---|---|
| 4,711,662 | 12/1987 | Harada | 75/503 |
| 5,885,328 | 3/1999 | Markarian et al. | 75/770 |

*Primary Examiner*—Jill Warden
*Assistant Examiner*—Tima McGuthry-Banks
*Attorney, Agent, or Firm*—Harold I. Masteller, Jr.; Joseph W. Berenato, III

[57] ABSTRACT

The invention is directed to a process for dehydrating and recycling back into a BOF converter wet BOF scrubber sludge to produce a steelmaking revert having an improved flow rate when handled in a recycle stream. Wet sludge is combined with hot BOF slag to provide a slag/sludge mixture. The wet sludge causes the mixture to have a moisture content greater than 10% water by weight, and the hot slag, having a temperature below the molten liquid state, vaporizes the water in the mixture and reduces the moisture content to about 4% water by weight or less. The dehydrated mixture has improved flow rate properties when it is recycled as a steelmaking revert.

25 Claims, 3 Drawing Sheets

REVERT MANUFACTURED FROM IRON-BEARING WASTE MATERIAL

This is a continuation of application Ser. No. 09/070,661, filed Apr. 30, 1998, which is a continuation-in-part of application Ser. No. 08/835,168, filed Apr. 8, 1997, U.S. Pat. No. 5,785,737, Jul. 28, 1998.

BACKGROUND OF THE INVENTION

The invention is related to a method for recycling iron-bearing dusts and sludges back into a steelmaking process, and more particularly, it relates to a method for recycling iron-bearing waste materials back into a basic oxygen furnace (BOF) simultaneous with the oxygen blow used in the process of converting molten iron into steel.

It is well known in the art of steelmaking that iron-bearing dust and sludges, generated by steelmaking furnaces, are valuable revert materials suitable for recycling back into steelmaking operations. Such waste materials contain iron oxides in an amount up to about 50% by weight, and it is very desirable to recover the iron for use as a steelmaking charge material. However, in the case of wet sludges, and especially in the case of wet BOF scrubber sludge, high moisture content makes the wet sludge very difficult to handle in a recycling stream.

Filter cake produced from wet scrubber sludge typically has a moisture content of about 30% by weight. The high viscosity of such wet sludges causes them to have poor handling characteristics. They stick to conveyors and machinery when attempts are made to convey them as reverts in a recycling stream. They move poorly and often form sticky agglomerations that clog and shutdown equipment and machinery. For example, under test conditions, it has been found that wet sludge having a moisture content of >10% has a flow rate of less than 10 pounds of sludge per minute. Such low flow rates make wet material very unsuitable for recycling as a steelmaking revert.

In instances where waste steelmaking dust is recycled back into the operation, the dry powdery condition of the material causes environmental dusting problems. To control dusting either water is added or the dry material is mixed with wet sludges to eliminate the dusting. However, when various different wet or dry waste materials are combined to produce a steelmaking revert, high levels of undesirable elements and compounds can be introduced into the steelmaking process. For example, if hot dip coating sludge is introduced into the recycling stream, the zinc in the recycling stream can rise to a level where the waste material is unsuitable for use in a steelmaking furnace. Therefore, such combining of steel plant wastes must be carefully monitored for chemistry to avoid introducing deleterious elements into the steelmaking process.

Various apparatus and methods have been developed in the past to reduce the moisture content and/or recover iron from wet sludges. For example, United States Reissue Patent No. 30,060 teaches a process that instantaneously vaporizes the water in sludge by spraying the sludge into a hot (1200° F.) gas stream. U.S. Pat. Nos. 4,091,545 and 4,133,756 also teach using a hot gas to reduce the moisture content of wet sludge.

U.S. Pat. Nos. 5,114,474, 4,725,307, 4,711,662 and 2,710,769, teach mixing wet sludges and dust with molten slag to produce reverts. The mixture is crushed for recycling after the slag cools and solidifies.

An article in "33 METALPRODUCING," March 1997, discloses a process that forms BOF waste sludge into briquettes. The apparatus used in the process includes a rotary kiln or dryer to remove water from the sludge, a roll-press, screw conveyors and pug mills. Such recycling plants require large capital investments. The use of a rotary kiln consumes expensive energy to generate heat for drying the sludge. The article also discloses using heated molasses as a binder to form the briquettes. The heated molasses also adds cost to the recycling process.

In the February 1997 issue of "NEW STEEL", an article by John Schriefer entitled *Reaping the value from dust and slag,* discloses that 11 steel mills located throughout Indiana and Ohio generated 959,000 tons of wet BOF sludge during the year 1992. In an effort to reduce landfill costs associated with disposing of such sludge, and in an effort to recover the valuable metallic materials contained in the sludge, such sludge is processed into briquettes for recycling back into a BOF as a source of iron. The article further mentions that such iron-bearing briquettes replace some of the steel scrap used in the BOF steelmaking process. Therefor, from a steelmaking viewpoint, it would appear reasonable that the article teaches charging the iron-bearing briquettes into the BOF vessel prior to the molten iron charge.

U.S. Pat. No. 3,870,507 to Allen is also directed to forming iron oxide briquettes. However, the Allen briquettes are recycled into a blast furnace with new iron making materials. Steelmakers are reluctant to charge such briquettes, dusts and sludges, back into steelmaking furnaces because steelmaking wastes usually contain high levels of heavy metals, for example zinc, and they adversely affect the quality of the finished steel product.

Finally, U.S. Pat. No. 5,496,392 to Simms, et. al. is directed to a method of recycling industrial waste. The recyclable iron-bearing material is either pelletized or formed into briquettes. The patent teaches that such briquettes are charged cold into a steelmaking furnace and heated up to temperature. The patent is absent of any teaching that would suggest charging such iron-bearing reverts into the vessel simultaneous with the oxygen blow.

Therefore, as shown in the patents, it is well known within the steelmaking art that steelmaking sludges and dusts can be processed and recycled as valuable reverts. It is also well recognized that wet sludges flow poorly and create logistical problems within a recycling stream because of their poor flow rate properties. The patents also teach that dry steelmaking waste materials present dusting problems during recycling. Finally, the above patents teach solving these well-known problems by dehydrating wet sludges with hot gases to produce a suitable sinter or charge material. The current state-of-the-art requires complex recycling facilities and hot gas blowers that consume large amounts of expensive energy to dry wet sludges. The hot gas vaporizes the water in the wet sludge and reduces the moisture content of the sludge to a level where the sludge can be used as a steelmaking revert.

SUMMARY OF THE INVENTION

Therefore, the primary object of the disclosed invention is to provide a process for dehydrating and recycling wet steelmaking sludges as iron-bearing reverts back into a BOF converter during the process of converting molten iron into steel. The process includes the steps of combining wet sludge and hot slag into a hot slag/sludge mixture; resting the hot slag/sludge mixture for a period of time to allow the hot slag to cause water vaporization and reduce the moisture content of the slag/sludge mixture to less than 10% by weight. The dehydrated slag/sludge mixture is recycled as a steelmaking revert back into the steelmaking vessel subsequent to the molten iron charge, and simultaneous with the oxygen blow that reduces the carbon content of the molten metal bath contained in the vessel.

These and other objects and advantages of the invention will be readily apparent in view of the following description and drawings.

DETAILED DESCRIPTION OF THE PREFERRED EMBODIMENT

Figure 1:
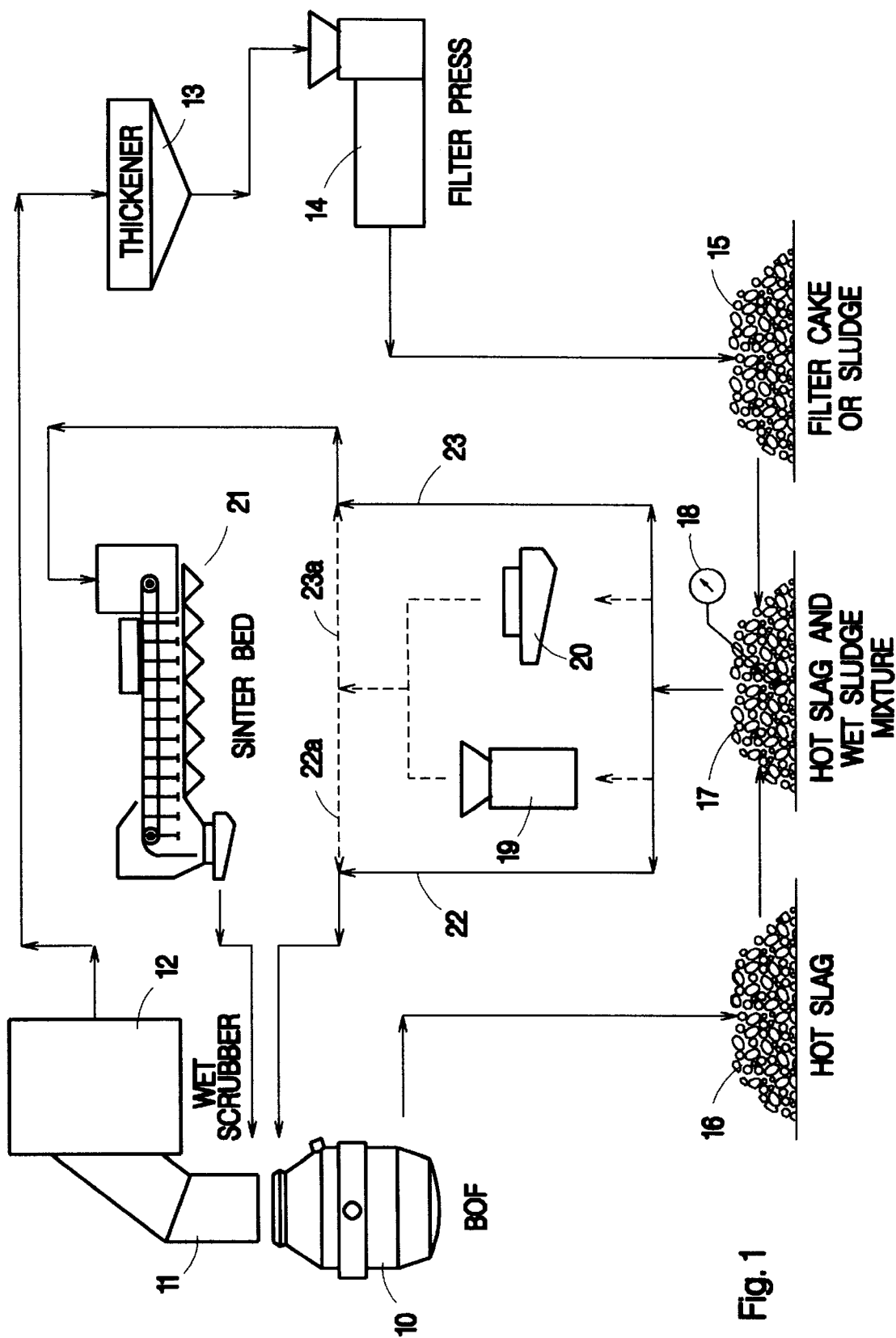
FIG. 1 is a flow diagram illustrating the steps of the process for treating wet steelmaking sludge to produce a steelmaking revert.

Referring to FIG. 1 of the drawings, modern steelmaking pollution control devices such as bag houses, precipitators, cyclones and scrubbers generate large quantities of iron-bearing dusts and sludges. Such waste materials are valuable reverts for charging back into the steelmaking furnaces. However, many of these waste materials are very high in water content due to the wet environmental processes, such as wet scrubbers, that are used to control steelmaking emissions.

In the preferred embodiment, FIG. 1 shows a basic oxygen furnace (BOF) 10 and hood 11 positioned above the mouth of the BOF to collect fume and gas that is emitted during the steel refining process. The fume and hot gasses are collected in a wet scrubber 12 and the wet scrubber sludge is sent to a thickener 13 where water is removed. A further downstream step in the recycling process typically includes either batch or continuous filtration of the wet sludge. This filtering step is carried out in press 14 where a wet filter cake 15 is produced. The filter cake, or sludge, has a moisture content of about 30% water by weight.

As heretofore mentioned, wet BOF sludge contains iron oxides in amounts of up to about 50% by weight, and it is very desirable to recover the iron for reuse as a charge material in the steelmaking operation. However, the high viscosity of the wet sludge makes it very difficult to handle the material as a steelmaking revert. It has been discovered that if the moisture content of the wet sludge can be reduced to less than about 10% water by weight, the flow rate properties of the sludge is improved to where the sludge can be conveniently handled as a steelmaking revert. Is has also been discovered that a preferred moisture content of between about 3-4% water produces a superior sludge flow rate as a revert.

Figure 2:
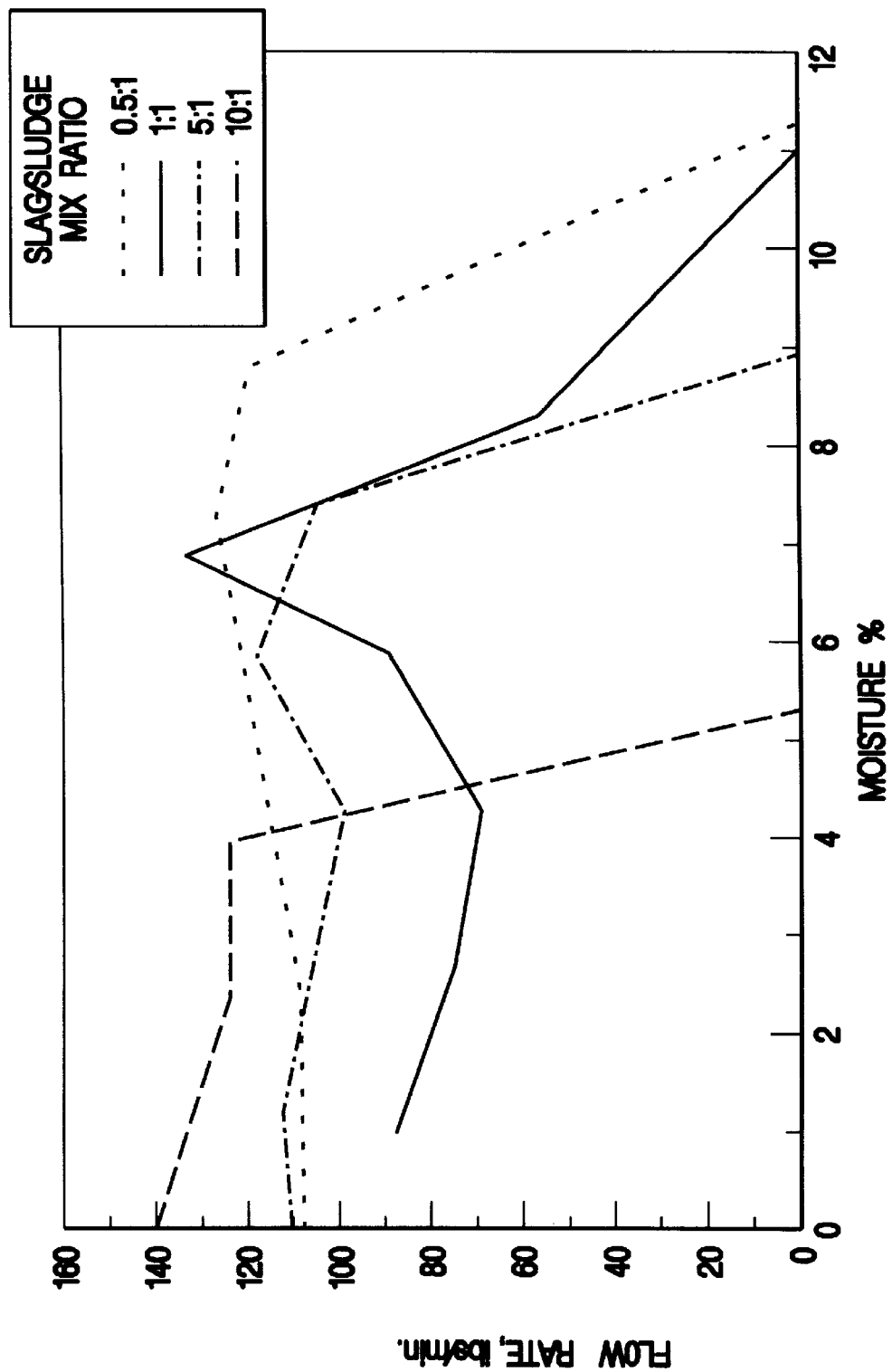
FIG. 2 is a graph showing flow rate measurements in relation to sludge moisture content.

For example, in the graph shown in FIG. 2, flow rate is plotted against the moisture content of four different mixture ratios ranging from a slag/sludge ratio of 0.05:1 up to a ratio of 10:1. The flow rate tests were conducted in a 2 cubic foot bin having a 65°-sloped floor to discharge the slag/sludge mixture through a 2½ square inch opening in the bin. The plotted data in FIG. 2 clearly shows that at a preferred 1:1 ratio, the slag/sludge flow rate decreases rapidly when the moisture content of the mixture exceeds 7% water by weight. Above about an 8% water content the flow rate of the material is considered only marginally acceptable, and above 10%, the material flow rate is unacceptable. Above 10%, the flow rates become very poor, and at a moisture content above 11% or higher, there is no material flow.

It can be seen that in order to use wet BOF sludge as a revert in a steelmaking process, it is necessary to first reduce the moisture content of the wet sludge to a level where the water in the sludge is less than 10% by weight. And as clearly shown in FIG. 2, the water level for all four tested mix ratios should be reduced to a preferred range of between about 3-4% to achieve optimum flow rates as shown in the plotted data. It has also been discovered, during actual use in a pilot test, that when the moisture content of the wet sludge material falls to a level below 3% dusting can become a problem. If this happens, water must be added to the slag/sludge mixture to bring the moisture content back up into the preferred 3-4% moisture range to eliminate dusting.

Dehydrating wet sludge is extremely energy intensive. The prior patents disclose sludge drying operations that consume large amounts of energy to generate heat for vaporizing the water in the sludge. It has been discovered that hot slag, at a temperature below the molten liquid state, provides a free heat source that can be combined with the wet BOF sludge to vaporize the water and lower the moisture content of the sludge.

As heretofore disclosed, the prior patents teach mixing molten slag with steelmaking dusts and sludges to recover iron from steelmaking waste. Such practice is extremely dangerous. Mixing molten slag with water can cause terrifying explosions. In the past, such explosions at steelmaking operations have resulted in injury and death to employees. The prior patents even warn of this problem. For example, Pinkerton discloses, in U.S. Pat. No. 2,710,796, that "Excessive water, however, must be avoided; the generation of steam is too violent . . . ". Explosive conditions are completely avoided when hot, not molten, slag is combined with wet sludge to drive off water from the sludge.

Referring again to FIG. 1, hot slag from supply 16 is combined with wet sludge from supply 15 to form a hot slag, wet sludge mixture at 17. The preferred and most convenient method for combining the hot slag and wet sludge is to blend alternating batches taken from the supplies 15 and 16. This produces the preferred 1:1 slag/sludge mixture ratio. However, it has been discovered that careful blending of the hot slag and wet filter cake or sludge is required to avoid rapid steam generation. The procedure developed to avoid rapid steam generation involves combining the materials into a stratum comprising alternating 1-2 feet thick layers of slag and wet filter cake or sludge. This procedure allows for safe evolution of steam and uniform drying of the filter cake or sludge. Reclaiming the layered pile 17 after curing for about 16 hours results in a uniform blend of the two materials suitable for any down stream processing, i.e., crushing screening, and/or magnetic separation. This procedure is readily done with front-end loader bucket used at most slag processing sites in the steel industry.

The slag/sludge mix rate can be changed to produce slag/sludge ratios up to about 10:1 or down to about 0.5:1. However, when the slag/sludge ratio is changed to increase the slag content in the mixture the metallurgical impact on finished product quality must be considered. It must be remembered that slag additions reintroduce removed impurities back into the steelmaking vessel. For example, in most instances, phosphorus is considered detrimental with respect to the quality of steel products. Metallurgists attempt to entrap phosphorus, and other impurities, within the slag cover that floats on the surface of the molten steel bath contained in a steelmaking vessel. These impurities are removed from the molten steel as the slag is systematically tapped.

TABLE A

SLAG/SLUDGE 1:1 RATIO
CHEMICAL ANALYSIS

| Symbol, %db | Slag/Sludge | BOF Slag | BOF Sludge |
|---|---|---|---|
| Fe | 41.0 | 21.4 | 60.9 |
| Mn | 2.1 | 3.5 | 0.86 |
| P | 0.3 | 0.7 | 0.06 |
| Zn | 0.9 | — | 1.4 |
| $SiO_2$ | 6.9 | 12.5 | 1.4 |
| CaO | 20.4 | 46.0 | 4.6 |
| MgO | 6.7 | 5.6 | 1.6 |
| $Al_2O_3$ | 1.0 | 1.1 | 0.1 |
| $TiO_2$ | 90.3 | — | 0.06 |

Table A shows the chemistry for a 1:1 slag/sludge mixture combined from BOF slag and BOF scrubber sludge. The table shows that the slag contains about 0.7% phosphorus by weight and the sludge contains about 0.06% phosphorus. The resulting combined mixture has about 0.3% phosphorus at a 1:1 slag/sludge mixture ratio. This is an acceptable phosphorus level for BOF charge material. If the 1:1 mixture ratio is changed to increase slag content, the phosphorus level will increase. For example, if the slag taken from supply 16 is combined with sludge from supply 15 at a 2:1 slag/sludge ratio the slag/sludge mixture will contain about 0.49% P, at a 5:1 ratio the mixture will contain about 0.59% P, and at a 10:1 ratio it will contain about 0.64% phosphorus.

After the slag/sludge mixture is dehydrated to the desired 34% moisture range its flow rate properties are improved, and it is sent downstream for additional processing. These additional processing steps can include magnetic separation 19, screening 20 and/or sintering 21. In mixtures that contain high zinc levels of about 0.9% and above, the mixture is not considered suitable for use in a sinter bed operation 21, and such slag/sludge mixtures are charged directly into the BOF with or without magnetic separation and/or screening as shown by lines 22 and 22a. In slag/sludge mixtures where the zinc concentration is lower than about 0.9% by weight, the mixture can be added to the sinter bed 21 with or without magnetic separation and/or screening as shown by lines 23 and 23a. However, it should be understood that low zinc level slag/sludge mixtures could be charged directly into a BOF without sintering.

It has been discovered that fine particles, about 20 mesh (~0.03 in.), in the reclaimed slag/sludge mixture that has particles ranging up to about 0.5 inch in size, can present a problem if the slag/sludge revert is charged directly into a BOF. It has also been discovered that such fine particles can be feed directly into a sinter plant without presenting any known problems in the sintering operation. When the smaller 20 mesh slag/sludge fines are charged directly into a BOF, they are carried out of the vessel with the off gases. This overloads the gas cleaning scrubber system and negates the recycling effort.

In order to solve this problem, lime can be added to the wet filter cake or sludge 15 in an amount of about 1% by weight. It is believed that the lime addition causes micropelletization of the slag/sludge fines during crushing and screening operations down stream from the blending process shown at 17. The many conveyor to conveyor transfer points, and the various water sprays located throughout a recycling operation, cause the lime to act as a binder and enhance agglomeration of the slag/sludge fines into micropellets. This reduces the amount of 20 mesh fines within the dried slag/sludge mixture and makes the revert more suitable for charging directly into a BOF vessel.

Under actual plant conditions, the lime blended, agglomerated slag/sludge mixture was charged into a BOF without any noticeable increase of fines in the off gases. The lime blending technique also reduced dusting problems during handling and charging of the blended material. As a result, the moisture content of the slag/sludge mixture can be further reduced to a preferred range of between about 24% water by weight when lime additions are blended with the filter cake.

Modern steelmaking requirements make it necessary for BOF operators to accurately calculate the exact weight of raw materials, and select various raw materials required for producing a given heat. These calculations and selections are based upon the specifications for the desired finished steel product. Utilizing data provided by the operators, computers calculate the required weights of molten iron and steel scrap needed for the particular heat, and the computer determines the proper amount of oxygen that will be blown into the molten metal bath to reduce the carbon content of the iron to a proper level for the steel grade. In the past, steelmakers have attempted to include in the calculations small amounts of iron-bearing reverts in an effort to recycle steelmaking waste back into the BOF steelmaking process. Such reverts are typically charged into the BOF vessel along with the cold steel scrap as disclosed above by Schriefer and Allen. However, heretofore, only small amounts of iron-bearing waste or reverts could be recycled back into the BOF, for example about 10% of the waste produced by the steelmaking process, because such waste typically contains heavy metals, for example zinc, that adversely affect the finished steel product.

The computer also calculates amounts of iron ore by weight for charging into the BOF during the oxygen blow. The iron ore functions as a coolant that reduces or maintains a desired temperature in the vessel. As the high velocity oxygen stream is injected into the molten iron it reduces the carbon content of the bath and converts the molten iron to steel. During the reaction, temperatures within the vessel are elevated as the injected oxygen removes carbon from the bath. The additional iron ore charge during the $O_2$ blow has a cooling affect on the reaction and prevents temperatures from reaching undesirable levels. It has been discovered that if the slag/sludge revert produced by the steps of the present invention is blended with the iron ore and charged as a coolant during the blow, the heavy metals contained in the revert are instantaneously vaporized and have little detrimental affect on the quality of the finished steel. Because of this discovery, greater amounts of steelmaking waste can be recycled as iron-bearing reverts back into the BOF steelmaking process, for example about 80% and higher of the total waste material produced by the steelmaking process. The revert/ore mixture is blended together at a rate or ratio based upon the iron content in the revert to the iron content in the iron ore. For example, if analyses shows a concentration of 45% Fe by weight in the revert, and a concentration of 65% Fe by weight in the iron ore, the amount of revert to ore is 45/65, or about one pound of revert to every 0.7-pounds of iron ore. The amount of recycled revert material is also adjusted for its slag content as well as for the valance state of the iron contained in the revert. The degree of reduction that will take place for the revert is directly related to the valance of the iron present in the material, i.e. the $Fe^0$, $Fe^{+2}$, and $Fe+^3$ present in the revert affects the chemistry of the finished steel.

When iron-bearing revert material, whether in briquette form or in granular form, are recycled back into a BOF vessel subsequent to the molten iron charge and simultaneous with the oxygen blow, the undesirable non-ferrous compounds contained in the revert material are instantaneously vaporized by the hot reactive temperatures and the high carbon atmosphere generated during the oxygen blow. Heavy metals, such as zinc, cadmium, etc., are volatilized in the presence of carbon. For example, in the case of zinc and zinc oxides, CO and $CO_2$ rich atmosphere above the hot molten metal bath has a temperature range of between 2400–3000° F., the carbon in the atmosphere reacts with zinc oxides in the revert material to remove oxygen and leave behind zinc metal that instantly fumes out in the high temperature through the BOF exhaust hood. Similarly, cadmium oxide will volatilize before reduction and fume out through the exhaust hood. The remaining iron revert/ore mixture is reduced to steel and combines with the product in the molten metal bath.

Figure 3:
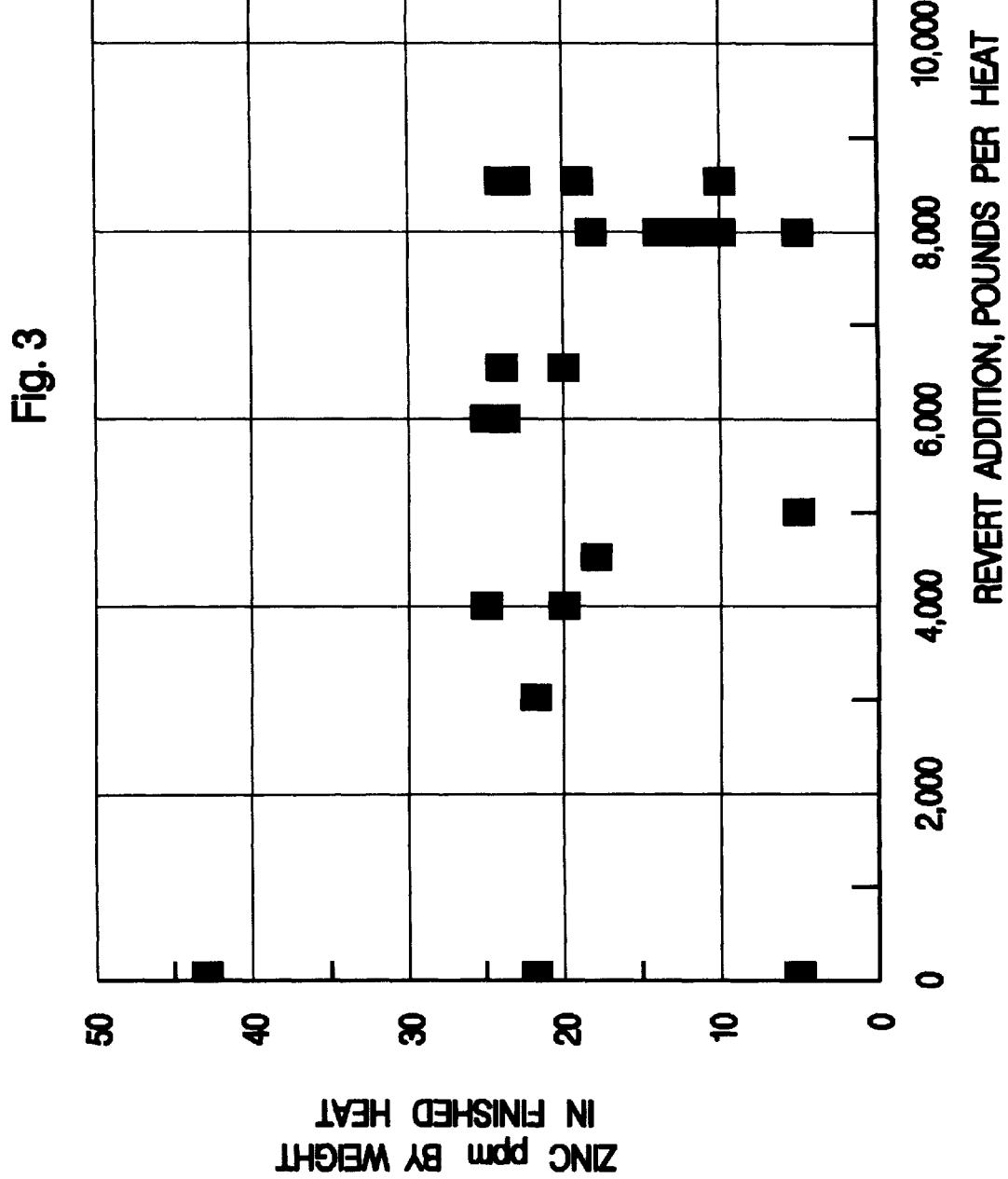
FIG. 3 is a graph showing steel analyses for finished BOF heats produced according to the steps of the present invention.

As shown in FIG. 3, charging iron-bearing revert material back into a BOF converter simultaneous with the oxygen blow avoids contaminating the finished steel product with heavy metals such as zinc. In actual practice, revert material containing zinc concentrations of up to about 200,000 ppm zinc by weight was recycled back into the converter. The plotted data shows that when such iron-bearing reverts are charged into a BOF, according to the steps set forth in the present invention (simultaneous with the oxygen blow) the mean level of zinc contained in the finished steel product is about 21 ppm, showing no adverse impact on the zinc content of the steel. We have also discovered that it is best to charge the revert/ore mixture early in the heat. Improved results appear to be achieved when the revert/ore mixture is charged within about one minute after the oxygen blow begins, or after about 23,000 cubic feet of $O_2$ is blown into the heat. This is because more complete reduction of the oxides contained in the revert is able to take place in the atmosphere above the bath due to the abundance of the CO and $CO_2$ generated during the initial stages of the $O_2$ blow. However, it has been found that revert/ore mixtures can be introduced into BOF converters at any time during the oxygen blow if they are introduced within a charge range that begins after about 20,000 cubic feet of $O_2$ is blown and ends after about 66,000 cubic feet of $O_2$ is blown into the heat, i.e. up to about 2.5 minutes from the start of the oxygen blow. The charging time for such revert/ore mixtures are between about 15 to 30 seconds to dump the entire batch into the furnace. The amount of iron-bearing revert in the charge can vary in weight up to about 15,000 pounds per heat depending on operating conditions. To accomplish a revert/ore charge, the BOF charging bin (not shown in the drawings) is filled with a predetermined amount of charge materials in the following order: 1) a calculated amount of iron ore based upon its iron content, 2) a calculated amount of revert material also based upon its iron content to satisfy, for example, the 1/0.7 revert/ore ratio disclosed above, and 3) a calculated amount of flux such as lime, limestone, dolomite, fluorite, etc. In past practice, steelmakers have chosen not to recycle granular revert material back into a steelmaking furnace to safeguard against producing a finished steel product outside specification.

It should be understood, that although the preferred embodiment discloses charging the slag/sludge revert produced by the steps of the present invention, any suitable iron-bearing revert can be charged into a BOF vessel as a revert/ore mixture without departing from the scope of this invention. In addition, it should also be understood that the slag/sludge manufacturing process is not limited to steelmaking operations. Any hot dross can be used as a heat source to dehydrate wet sludge produced in any metal refining or smelting operation, and that such dross/sludge mixtures can be recycled back into their respective refining or smelting operations.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

We claim:

1. A revert, comprising:
   a. a blend of steelmaking sludge and slag dried to a moisture content of less than 10% by weight, a substantial portion of said blend having a size in excess of 20 mesh, said blend having been prepared from hot slag having a temperature below the molten liquid state and wet sludge.
2. The revert of claim 1, wherein:
   a) the dried blend has a moisture content of about 3% by weight to about 4% by weight.
3. The revert of claim 2, wherein:
   a) said dried blend contains iron in an amount greater than about 50% by weight.
4. The revert of claim 3, wherein:
   a) said dried blend contains zinc in an amount less than about 0.9% by weight.
5. The revert of claim 3, wherein:
   a) said dried blend contains zinc in an amount greater than about 0.9% by weight.
6. The revert of claim 3, wherein:
   a) said dried blend has a particle size of less than about 0.5 inches.
7. The revert of claim 3, wherein:
   a) said dried blend contains at least one substance selected from a group consisting of iron, manganese, phosphorous, zinc, silicon dioxide, calcium oxide, magnesium oxide, aluminum oxide, and titanium oxide.
8. The revert of claim 1, wherein:
   a) said dried blend contains iron in an amount greater than about 50% by weight.
9. The revert of claim 8, wherein:
   a) said dried blend contains zinc in an amount less than about 0.9% by weight.
10. The revert of claim 8, wherein:
    a) said dried blend contains zinc in an amount greater than about 0.9% by weight.
11. The revert of claim 1, wherein:
    a) said dried blend contains phosphorous in an amount less than about 0.3% by weight.
12. The revert of claim 1, wherein:
    a) said dried blend contains at least one substance selected from a group consisting of iron, manganese, phosphorous, zinc, silicon dioxide, calcium oxide, magnesium oxide, aluminum oxide, and titanium oxide.
13. The revert of claim 1, wherein:
    a) said steelmaking blend is basic oxygen furnace sludge.

14. The revert of claim 1, wherein:
a) said dried blend has a particle size of less than about 0.5 inches.

15. The revert of claim 1, wherein:
a) said dried blend contains lime.

16. An intermediate product, comprising:
a. a blend of steelmaking sludge and slag having a moisture content of less than about 10% by weight,
b. a substantial portion of said dried blend having a particle size in excess of 20 mesh, said blend having been prepared from hot slag having a temperature below the molten liquid state and wet sludge; and
c. an iron content of at less 50% by weight.

17. The product of claim 16 wherein:
a) said dried blend has a moisture content of between about 3% by weight to about 4% by weight.

18. The product of claim 17 wherein:
a) said dried blend contains zinc in an amount less than about 0.9% by weight.

19. The product of claim 17 wherein:
a) said dried blend has a particle size of less than about 0.5 inches.

20. The product of claim 17 wherein:
a) said dried blend contains at least one substance selected from a group consisting of iron, manganese, phosphorous, zinc, silicon dioxide, calcium oxide, magnesium oxide, aluminum oxide, and titanium oxide.

21. A product manufactured by the process of comprising the steps of combining steelmaking wet sludge with hot steelmaking slag to produce a slag/sludge mixture having a moisture content greater than 10% by weight, said hot slag having a temperature below the molten liquid state, thus continuing the step of combining the wet sludge and the hot slag and resting the slag/sludge mixture for a period sufficient to enable radiant energy admitted from the hot slag to vaporize water in the slag/sludge mixture and to thereby reduce the moisture content to less than 10% by weight, and charging into a heat produced in the steel making furnace the slag/sludge mixture as a revert having the reduced moisture content, the product having a particle size in excess of about 20 mesh and an iron content of at least 50% by weight.

22. The product of claim 21 wherein:
a) said dried slag/sludge mixture has a moisture content of between about 3% by weight to about 4% by weight.

23. The product of claim 22 wherein:
a) said dried slag/sludge mixture contains zinc in an amount less than about 0.9% by weight.

24. The product of claim 22 wherein:
a) said dried slag/sludge mixture has a particle size of less than about 0.5 inches.

25. The product of claim 22 wherein:
a) said dried slag/sludge mixture contains at least one substance selected from a group consisting of iron, manganese, phosphorous, zinc, silicon dioxide, calcium oxide, magnesium oxide, aluminum oxide, and titanium oxide.

* * * * *